United States Patent Office 3,199,947
Patented Aug. 10, 1965

3,199,947
METHOD OF PURIFYING REFRACTORY
SULFIDES
Charles d'A. Hunt, Orinda, and Hugh R. Smith, Jr., Piedmont, Calif., assignors to Temescal Metallurgical Corporation, Richmond, Calif., a corporation of California
No Drawing. Filed Dec. 8, 1959, Ser. No. 858,019
3 Claims. (Cl. 23—14.5)

The present invention relates in general to a commercially feasibly and economically advantageous process for preparing refractory sulfides.

In the metallurgical field there have been made many recent advances in the processing and utilization of less common metals having particular properties that are greatly sought by industry. For example, certain refractory metals and rare earth metals have become very important in a wide variety of processes and products. In the processing of these metals such as, for example, titanium and uranium, formidable problems have arisen in providing containers that are suitable for containing same in a molten state. The chemically active properties of many metals of interest, as well as the high temperatures necessarily involved in the processing of same, have imposed very difficult requirements upon containers for these metals. In this respect the monosulfides of metals of the lanthanide series, the actinide series and mixtures thereof, including misch metal, show great promise.

Upon the theoretical basis, it has been postulated that crucibles of rare earth sulfides, for example, would be suitable for containing molten metals of extreme chemical activity. Following this postulation there were reportedly prepared with great care at least samples of certain sulfides, and same were found to indeed exhibit the predicted properties which would make them of great value as containers of molten metal for high chemical activity. Subsequently efforts to reproduce these sulfides in quantity have apparently been universally unsuccessful. For example, commercial processing of cerium to form the sulfide thereof has produced a material which was analyzed to be CeS, but which was quickly attacked by molten titanium, for example, with a failure of a container formed of the prepared CeS.

The present invention is directed to a process for preparing a pure refractory monosulfide which exhibits the theoretical properties of such material. Furthermore, the present invention is particularly concerned with such a process which is adapted for large-scale processing so as to provide a commercially feasible process whereby refractory sulfides of desired properties may be inexpensively produced in quantity.

It has been proposed to form crucibles or the like from refractory sulfides by pressing and sintering monosulfide powders. This form of processing is quite difficult because of the pyrophoric nature of the materials being handled, so that the practicability of such processing is limited. It has also been found that failure of refractory sulfides to exhibit theoretical properties is traceable to the degree of purity of the metal. Extensive analysis shows that the presence of oxides or oxysulfides in minute quantities seriously contaminates the metal sulfide. Oxides and oxysulfides are found to concentrate at the grain boundaries of the metal sulfide, and as these materials are not resistant to attack, very small concentrations of same are sufficient to allow destructive inter-granular attack.

The present invention provides a process which overcomes the above-noted difficulties by eliminating the hazardous steps of pressing and sintering pyrophoric materials and at the same time substantially entirely removes the objectionable impurities which so deleteriously affect the properties of very heavy metal sulfides. The present process also provides sulfides of much greater density than has been hitherto available. The purification process hereof serves to remove oxides and oxysulfides from refractory metal sulfides by raising the temperature of the sulfide to volatilize the objectionable impurities, the latter being then removed. This same high temperature purification is herein employed to melt the refractory sulfide for casting of same and to produce a very dense casting.

The present invention in brief comprises the application of heat to powdered refractory sulfides to raise the temperature thereof. In the process of raising the temperature, oxides and oxysulfides, as well as certain other impurities present, are first volatilized. Continuous evacuation removes the above-noted volatilized impurities. Additional heating of the purified sulfide causes same to become entirely molten, and such molten material is then cast to form ingots of truly pure refractory sulfides. Containers formed of refractory sulfides processed in accordance with the present invention have proven to be truly invulnerable to attack by chemically active metals in the molten state.

It is an object of the present invention to provide an improved process for purifying monosulfides of the lanthanide and actinide series.

It is another object of the present invention to provide a purification process for monosulfides of the lanthanide and actinide series as well as mixtures thereof, which is quite safe, simple, and inexpensive so as to produce refractory sulfides of high density in commercial quantities in an economical fashion.

It is a further object of the present invention to provide an improved process for producing materials suitable to contain molten metals of great chemical activity at elevated temperatures.

It is yet another object of the present invention to provide a safe, inexpensive, and readily controlled process for producing monosulfides of the lanthanide and actinide series which exhibit the resistance to attack by molten metals theoretically predicted for same.

Various other possible objects and advantages of the present invention will become apparent to those skilled in the art from the following description; however, no limitation is intended by the terms of the description, instead, reference is made to the appended claims for a precise delineation of the true scope of the present invention.

Considering now the improved process of the present invention, it is first contemplated herein that there shall be provided a sulfide of the metal of the lanthanide or actinide series. Various methods are known for producing heavy metal sulfides, and even certain of the lanthanide and actinide series are commercially available. Despite the common acceptance of conventional processes as producing what is generally termed to be pure sulfides of heavy metals, it has been found that only a relatively low order of purity is actually attained. Statements to the effect that a pure sulfide is obtained when the oxide of a heavy metal is heated with sulphur may be found in standard texts on the subject. To the extent that purity has in the past been a question, this statement is undoubtedly true. Intensive and very careful investigation, however, has shown that sulfides so prepared are, in fact, contaminated with oxides and oxysulfides. In reality the contamination may actually be of a relatively low order; however, the effects of such contamination have been clearly shown to markedly affect the resultant properties of the sulfides. Thus, as noted above, impurities such as oxides and oxysulfides are found to congregate at the grain boundaries in heavy metal sulfides, and inasmuch as these impurities are not resistant to attack by certain substances, such as, for example, chemically active metals, a container or the like formed of what is normally presumed to be a pure sulfide will exhibit severe attack by chemically active metals. With this basic premise in mind, it then follows that the substantially complete removal of impurities, such as oxides and oxysulfides, from monosulfides of the lanthanide and actinide series is highly important to attain the theoretical refractory characteristics of the sulfides. The present invention operates to attain these refractory characteristics by the ready and rapid removal of such impurities.

In accordance with the present invention, a monosulfide of a metal of the lanthanide or actinide series, or mixtures thereof, is initially employed as a charge for the process hereof. This charge material may contain substantial amounts of impurities, such as oxides and oxysulfides. In accordance herewith the charge material is heated to a sufficient temperature to melt the monosulfide. This heating step of the present invention is accompanied by a continued evacuation of the region immediately about the monosulfide so as to thereby rapidly and efficiently remove volatile impurities. It has been found in accordance herewith that oxysulfides and oxides of materials herein processed are volatilized at a temperature below the melting point of the metal monosulfide. It is thus possible, in accordance herewith, to purify and cast monosulfides of the lanthanide and actinide series through the single step of heating a charge material of impure monosulfide to the melting point thereof, so as to liquify the metal which upon cooling forms a cast ingot of theoretical density. Heating may be accomplished by means such as electron bombardment or high-frequency induction heating in a high vacuum, one micron of mercury or less. The continued evacuation or removal of gases and vapors evolved from the melting charge material serves to purify the material to such an extent that substantially all of the oxides and oxysulfides are removed from the resultant cast monosulfide. In accordance herewith, the single step set forth above, wherein a charge material is heated and vapors and gases therein evolved are immediately removed therefrom, may be repeated a plurality of times in order to attain a desired extreme purity of the resultant monosulfide of the lanthanide and actinide series.

As an example of purification and processing in accordance with the present invention, there has been performed the following process with the results as set forth at the end thereof.

A charge of cerium sulfide (CeS) was placed in a high vacuum furnace, wherein heat was supplied by electron bombardment. A furnace of this type is disclosed in U.S. Patent No. 2,880,483. The furnace chamber was continuously evacuated and maintained at a pressure of the order of one micron of mercury. The charge of CeS was bombarded by electrons to thereby melt the charge material, whereupon same became liquefied. In the process of this melting, the temperature of the CeS reached the melting temperature of same, and this temperature was indirectly determined to be in the range of 2600° C. to 2900° C. As noted above, the region about the charge material and melt was continuously evacuated, and during the processing a substantial amount of gases and vapors were evolved and removed.

In this example, a tantalum crucible was employed to contain the CeS, and it was observed during melting of the sulfide that same bubbled during the first few minutes that it was molten and that vapors were given off from the melt. Upon removal of the cerium sulfide from the tantalum crucible, it was observed that the sulfide was a bright yellow brass color on surfaces freshly exposed to air. The sulfide was found to be easily machined and to have a density equal to the theoretical density of CeS. Analysis of the material so processed produced photomicrographs of polished surfaces thereof showing that the product was homogeneous with no visible concentration of foreign matter at the grain boundaries.

In order to further insure that the material processed in accordance with the present invention as set forth in the above example truly met the requirements of a refractory sulfide which could be employed as a container for chemically active metals, a sample of titanium was then melted in high vacuum with the cerium sulfide being employed as a crucible therefor. Such a crucible was machined from a solid piece of cerium sulfide processed in accordance with the above example. By the application of heat to the titanium placed within such crucible by bombardment of the titanium with electrons, the titanium was melted and then cooled to solidify in the crucible. Although careful inspection showed that the titanium wet the crucible, a subsequent chemical analysis of the titanium so melted showed that no cerium was present. A cross-section of the crucible containing the solidified metal was examined microscopically, and no evidence of attack could be identified.

It is thus determined from the foregoing example and careful analysis and further testing set forth above that cerium sulfide prepared in accordance with the present invention provides a refractory sulfide material which is suitable to contain chemically active metals in a molten state. The cerium sulfide, by purification in accordance with the present invention, does not exhibit the susceptibility to attack that cerium sulfide of normal purity does exhibit.

The present invention is applicable not only to the rare earths, or lanthanide series as established by the above example, but also to the actinide series and to so-called misch metal monosulfides formed of mixtures of metals of the two series with other elements. There is produced in accordance with the present invention monosulfides of the lanthanide and actinide series, as well as mixtures thereof, having a high purity and maximum density, and repetition of the foregoing example establishes the reliability of the present invention, for in each case the resultant monosulfide is found to be substantially impervious to attack by chemically active molten metals. The foregoing is true even though the charge employed as an initiating material in the process is heavily contaminated with such undesirable impurities as oxides and oxysulfides.

A further example of the present invention is found in the application of the process hereof to an element of the actinide series, thorium sulfide being employed as an initial charge material for the process. Thorium monosulfide may be produced in conventional manner well known in the art. Such material is normally considered to be chemically pure and for the majority of purposes is sufficiently pure to be properly known by the term. Insofar as resistance to attack by chemically active molten metals, it has been found that thorium monosulfide prepared in the normal conventional way is not capable of providing the refractory characteristics desired. Again, as in the instance above, it has been found that the presence of oxides and oxysulfides concentrating at the grain boundaries of the monosulfide material provides weak points which are attacked by chemically active metals, so that the overall structure rapidly fails, even though the monosulfide material itself is not affected. With a charge material of ThS of conventional purity, same was herein heated in a high vacuum of at least one micron of mercury until the sulfide melted, and during this melting there were evolved gases and vapors from the thorium sulfide, which were removed by continuous evacuation. In the melting of thorium sulfide the temperature was raised above 2200° C. so as to thereby form a liquid of the material, such that same was cast in the molten state, and also so that volatile impurities were driven from the melt.

The resultant thorium monosulfied product in accordance with the above example was also analyzed and found to have an homogeneous character with no visible concentration of foreign matter at the grain boundaries. The melting of a chemically active metal, titanium, in a crucible formed of thorium sulfied purified and cast in accordance with this example produced no visible effect upon the crucible so formed. Following careful anaylsis of the thorium sulfied material of the crucible after melting of titanium threrin, it was found that no visible attack had been made upon the crucible structure. It thus follows that the sulfide so prepared in accordance with the present invention exhibited truly refractory materials capable of containing melted titanium.

From the foregoing it is believed apparent that there is provided by the present invention a process for purifying and casting refractory sulfides of the lanthanide and actinide series, as well as mixtures thereof, so as to produce materials exhibiting extraordinary refactory characteristics. Refractory sulfides produced in accordance with the present invention are suitable to contain such chemically active metals such as titanium, zirconium and uranium without substantial attack by these matels. It will, of course, be appreciated that the suffides produced by the present invention are suitable as materials for containers adapted to contain molten metals having melting temperatures substantially below the melting temperature of the monosulfide. Thus, for example, cerium sulfide is found to melt in a temperature range of 2600° C. to 2900° C. so that metals having a melting point of about 200° below this lower figure can be suitably contained without attack in crucibles formed of cerium sulfide produced by the present invention. In this respect, thorium sulfide is found to melt about 2200° C., and consequently, those metals having a melting temperature of about 2000° C. or less may be contained in a molten state by crucibles or containers formed of thorium sulfide purified and cast in accordance with the present invention.

In addition to the material improvement provided by the present invention in purification of refractory sulfides as set forth above, the present invention further provides for a highly improved method of handling these sulfides to provide solid ingots of same, whereby containers, such as crucibles or the like, may be readily formed therefrom. In accordance herewith, the sulfide is cast in a pure state, so that a dense solid state material results, and consequently may be readily machined and otherwise formed into desired shapes and configurations. This is an idrirect contradiction to the prior-art methods of sintering and pressing powdered sulfides, wherein the pyrophoric nature thereof causes an extreme safety hazard. No difficulties whatsoever are encountered in the present invention insofar as safety is concerned, for it is not necessary in accordance herewith to sinter or press powdered sulfides. It is well known in the art that the explosive nature of these materials calls for extreme precaution in their handling. These precautions, which formerly limited the production of this material and materially added to the cost thereof, are herein precluded. It is possible in accordance with this invention to economically produce substantial quantities of refractory sulfides formed of the monoslufides of the lanthanide and actinide series wherein these sulfides are produced in ingots of substantial size, which then may be directly machined or otherwise operated upon to produce desired geometries.

It will be appreciated from the foregoing that the present process provides a material advancement in the art in that a very substantial simplification in processing is herein provided, as well as the provision of particular classes of materials hitherto only obtainable through carefully controlled experimental laboratory processing. Insofar as the heating and evacuation of the present process are concerned, no limitation is herein intended as to the manner or means of accomplishing same. Thus, for example, it is possible to use any desired evacuation means, and furthermore, it is possible in accordance herewith to utilize a variety of heating means. Although the above examples particularly set forth the utilization of electron bombardment heating in high vaccum, it is also possible to employ induction heating to attain the desired temperatures for melting of the charge material. The foregoing examples are set forth merely as such and are in no way intended to be limiting upon the present invention, particularly as regards the specific apparatus that may be employed in connection with the process steps hereof.

What is claimed is:

1. A method of purifying a refractory metal monosulfide selected from the lanthanide and actinide series containing minor amounts of oxide and oxysulfide impurities, which method comprises heating a monosulfide of a metal selected from the group consisting of the lanthanide and actinide series in the absence of any reactive material at a reduced pressure of not more than one micron of mercury and at a temperature sufficient to form a molten bath of the monosulfide at said pressure and to vaporize oxide and oxysulfide impurities from the monosulfide but insufficient to vaporize the monosulfide, continuously removing the vaporized oxides and oxysulfides from the region of the molten monosulfide, and recovering the monosulfide in a highly purified form, whereby a purified monosulfide is provided which is substantially impervious to chemical attack by molten metal.

2. A method of purifying cerium monosulfide containing minor amounts of cerium oxide and cerium oxysulfide impurities comprising, heating cerium monosulfide in the absence of any reactive material at a reduced pressure of not more than one micron of mercury and at a temperautre of about 2600° C. to form a molten bath of the cerium monosulfide at said pressure and to vaporize cerium oxide and cerium oxysulfide impurities from the cerium monosulfide with vaporizing a substantial amount of cerium monosulfide, continuously removing the vaporized cerium oxide and cerium oxysulfide from the region of the molten cerium monosulfide, and recovering the cerium monosulfide in a highly purified form, whereby a purified cerium monosulfide is provided which is substantially impervious to chemical attack by molten metal.

3. A method of purifying thorium monosulfide containing minor amounts of thorium oxide and thorium oxysulfide impurities comprising, heating thorium monosulfide in the absence of any reactive material at a reduced pressure of not more than one micron of mercury and at a temperature of about 2200° C. to form a molten bath of the thorium monosulfide at said pressure and to vaporize thorium oxide and thorium oxysulfide impurities from the thorium monosulfide without vaporizing a substantial amount of thorium monosulfide, continuously removing the vaporized thorium oxide and thorium oxysulfide from the region of the molten thorium monosulfide, and recovering the thorium monosulfide in a highly purified form whereby a purified thorium monosulfide is provided which is substantially impervious to chemical attack by molten metal.

(References on following page)

References Cited by the Examiner

UNITED STATES PATENTS

| | | | |
|---|---|---|---|
| 2,843,914 | 7/58 | Khoury | 23—134 X |
| 2,893,831 | 7/59 | Bither | 23—134 X |

OTHER REFERENCES

Brewer et al., abstract of application S.N. 791,466, published 641 O.G. 1346, Dec. 26, 1950.

Brewer et al., abstract of application S.N. 791,469, published 641 O.G. 1347, Dec. 26, 1950.

Eastman et al., "J. Am. Chem. So.," vol. 72, pages 4019—4023 (1950).

Eastman et al., "J. Am. Chem. Soc.," vol. 73, pages 3896–3898 (1951).

"Nuclear Science Abstracts," vol 10, Abstracts 5257 and 8860 (1956.)

"Nuclear Science Abstract," vol. 11, Abstract 7177 (1957).

CARL D. QUARFORTH, *Primary Examiner.*

ROGER L. CAMPBELL, REUBEN EPSTEIN,
*Examiners.*